(12) United States Patent
Takagi et al.

(10) Patent No.: US 11,331,934 B2
(45) Date of Patent: May 17, 2022

(54) PRINTER

(71) Applicant: FUNAI ELECTRIC CO., LTD., Osaka (JP)

(72) Inventors: Masaaki Takagi, Kashihara (JP); Akira Hayashi, Kakogawa (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 62 days.

(21) Appl. No.: 17/051,255

(22) PCT Filed: May 29, 2019

(86) PCT No.: PCT/JP2019/021174
§ 371 (c)(1),
(2) Date: Oct. 28, 2020

(87) PCT Pub. No.: WO2020/110351
PCT Pub. Date: Jun. 4, 2020

(65) Prior Publication Data
US 2021/0229464 A1 Jul. 29, 2021

Related U.S. Application Data

(60) Provisional application No. 62/773,537, filed on Nov. 30, 2018.

(51) Int. Cl.
*B41J 3/407* (2006.01)
*G06T 7/73* (2017.01)
(Continued)

(52) U.S. Cl.
CPC .............. *B41J 3/407* (2013.01); *A45D 29/00* (2013.01); *A45D 34/04* (2013.01);
(Continued)

(58) Field of Classification Search
CPC ......... B41J 3/407; B41J 2/04586; G06T 7/60; G06T 7/62; G06T 7/64; G06T 7/73; A45D 2029/005; A45D 34/04; A45D 29/00
See application file for complete search history.

(56) References Cited

U.S. PATENT DOCUMENTS

| 5,931,166 A | 8/1999 | Weber et al. |
| 10,384,483 B2 * | 8/2019 | Kasahara ............... G06V 10/46 |

(Continued)

FOREIGN PATENT DOCUMENTS

| JP | 2003-534083 | 11/2003 |
| JP | 2013-59579 | 4/2013 |

(Continued)

OTHER PUBLICATIONS

International Search Report (ISR) dated Aug. 13, 2019 in International (PCT) Application No. PCT/JP2019/021174.

*Primary Examiner* — Thinh H Nguyen
(74) *Attorney, Agent, or Firm* — Wenderoth, Lind & Ponack, L.L.P.

(57) ABSTRACT

A printer includes a head which includes a nozzle face which ejects ink toward a top of a surface of a nail of a finger, a driving mechanism which moves the head in a predetermined direction, an image capturer which generates a nail side image showing a side of the nail of the finger by capturing an image of the nail of the finger, and a display controller which performs image processing on the nail side image from the image capturer, causing a display to display an image for height position adjustment including a target height position indicator added to the nail side image, the target height position indicator indicating a target height position of the nail of the finger spaced from the nozzle face by a predetermined distance.

7 Claims, 10 Drawing Sheets

(51) Int. Cl.
  *A45D 29/00* (2006.01)
  *A45D 34/04* (2006.01)
  *B41J 2/045* (2006.01)
(52) U.S. Cl.
  CPC .............. *B41J 2/04586* (2013.01); *G06T 7/73* (2017.01); *A45D 2029/005* (2013.01)

(56) References Cited

U.S. PATENT DOCUMENTS

2013/0019799 A1  1/2013  Bitoh
2017/0008277 A1  1/2017  Matsuda

FOREIGN PATENT DOCUMENTS

| | | |
|---|---|---|
| JP | 2014-121344 | 7/2014 |
| JP | 2017-18589 | 1/2017 |
| WO | 01/91598 | 12/2001 |

* cited by examiner

PRINTER

TECHNICAL FIELD

The present disclosure relates to a printer for printing on fingernails of users.

BACKGROUND ART

Printers for printing manicure colors or motifs on fingernails of hands of users using an ink jet method are known (see Patent Literature (PTL) 1, for example). The printer of this type includes a head having a nozzle face which ejects ink to a fingernail, and a driving mechanism which moves the head in a first direction and a second direction approximately orthogonal to the first direction.

CITATION LIST

Patent Literature

PTL 1: Japanese Unexamined Patent Application Publication No. 2013-59579

SUMMARY OF INVENTION

Technical Problem

To precisely perform printing on the fingernails in the printer described above, the user should adjust the height position of the fingernail with respect to the nozzle face of the head to a predetermined height position appropriately spaced from the nozzle face.

However, the user has difficulties in intuitively finding such an appropriate distance from the fingernail to the nozzle face. For this reason, the fingernail may reside not at the predetermined height position, and may be too remote from the nozzle face or may be too close to the nozzle face to come into contact with the nozzle face.

The present disclosure has been made to solve the problem above, and an object of the present disclosure is to provide a printer which can facilitate adjustment of the height position of a fingernail with respect to the nozzle face of the head.

Solution to Problem

To achieve the above object, the printer according to one aspect of the present disclosure is a printer for printing on a fingernail of a user, the printer including: a head which includes a nozzle face which ejects ink toward a surface of the fingernail; a driving mechanism which moves the head in a predetermined direction; an image capturer which captures an image of the fingernail to generate a nail side image showing a side of the surface of the fingernail; and a display controller which causes a display to display an image for height position adjustment including a target height position indicator added to the nail side image by performing image processing on the nail side image from the image capturer, the target height position indicator indicating a target height position of the fingernail spaced from the nozzle face by a predetermined distance.

According to this aspect, the display controller causes the display to display the image for height position adjustment including the target height position indicator added to the nail side image. Thereby, while viewing the image for height position adjustment displayed on the display, the user can easily adjust the height position of the fingernail with respect to the nozzle face of the head to the target height position such that the predetermined part of the fingernail is aligned with the target height position indicator on the image for height position adjustment. As a result, printing can be precisely performed on the fingernail.

For example, in the printer according to one aspect of the present disclosure, the image capturer may be configured to capture an image of the fingernail to generate a nail top image showing a top of the surface of the fingernail, and the display controller causes the display to display the image for height position adjustment and an image for horizontal lengthwise position adjustment including a target horizontal lengthwise position indicator added to the nail top image by performing image processing on the nail top image from the image capturer, the target horizontal lengthwise position indicator indicating a target horizontal lengthwise position of the fingernail with respect to the nozzle face.

According to this aspect, the display controller causes the display to display the image for height position adjustment and the image for horizontal lengthwise position adjustment including the target horizontal lengthwise position indicator added to the nail top image. Thereby, while viewing the image for horizontal lengthwise position adjustment displayed on the display, the user can easily adjust the horizontal lengthwise position of the fingernail with respect to the nozzle face of the head to the target horizontal lengthwise position such that the predetermined part of the fingernail is aligned with the target horizontal lengthwise position indicator on the image for horizontal lengthwise position adjustment. As a result, the fingernail can be more precisely printed.

For example, in the printer according to one aspect of the present disclosure, the printer may further include a mirror which reflects the side of the surface of the fingernail. The image capturer may generate the nail top image by directly capturing an image of the top of the surface of the fingernail, and may generate the nail side image by capturing an image of the side of the surface of the fingernail reflected on the mirror.

According to this aspect, the printer can have a simplified configuration because one image capturer generates both the nail top image and the nail side image.

For example, in the printer according to one aspect of the present disclosure, the printer may further include a mirror which reflects the top of the surface of the fingernail. The image capturer may generate the nail side image by directly capturing an image of the side of the surface of the fingernail, and may generate the nail top image by capturing an image of the top of the surface of the fingernail reflected on the mirror.

According to this aspect, the printer can have a simplified configuration because one image capturer generates both the nail top image and the nail side image.

For example, in the printer according to one aspect of the present disclosure, the display controller may be further configured to cause the display to display a notice for informing the user when a height position of the fingernail is deviated from the target height position.

According to this aspect, the user sees the notice displayed on the display, and thereby can recognize that the height position of the fingernail with respect to the nozzle face is deviated from the target height position.

For example, in the printer according to one aspect of the present disclosure, the target height position indicator may be configured to indicate a target height position range between a target upper limit height position of the fingernail spaced from the nozzle face by a first predetermined distance and a target lower limit height position of the fingernail spaced from the nozzle face by a second predetermined distance longer than the first predetermined distance.

According to this aspect, the precision of adjustment of the height position of the fingernail with respect to the nozzle face can have a higher allowance.

For example, the printer according to one aspect of the present disclosure may be configured such that the first predetermined distance is 1 mm and the second predetermined distance is 3 mm.

According to this aspect, the height position of the fingernail with respect to the nozzle face of the head can be adjusted to the target height position range spaced from the nozzle face only by 1 mm to 3 mm.

It should be noted that the present disclosure can also be implemented as a program causing a computer to function as a characteristic processor included in the printer or a program causing a computer to execute characteristic steps included in a method of controlling the printer. Needless to say, such a program can be distributed through a computer-readable non-transitory recording medium such as a compact disc-read only memory (CD-ROM) or a communication network such as the Internet.

Advantageous Effects of Invention

The printer according to one aspect of the present disclosure can facilitate the adjustment of the height position of the fingernail with respect to the nozzle face of the head.

DESCRIPTION OF EMBODIMENTS

Embodiments according to the present disclosure will now be described in detail with reference to the drawings. The embodiments described below all illustrate comprehensive or specific examples. Numeric values, shapes, materials, components, arrangements and positions of the components, and connection forms thereof shown in the following embodiments are exemplary, and should not be construed as limitations to the present disclosure. Moreover, among the components of the embodiments below, the components not described in an independent claim will be described as arbitrary components.

Embodiment 1

[1-1. Structure of Printer]

Figure 1:
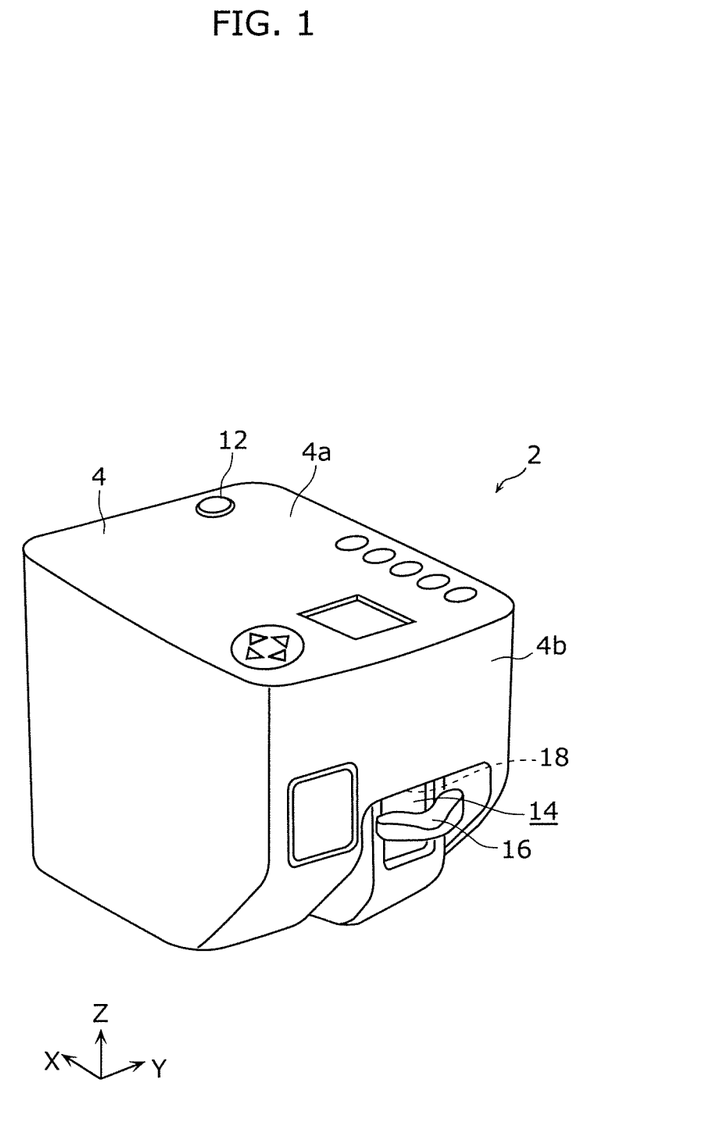
FIG. 1 is a perspective view illustrating an appearance of the printer according to Embodiment 1.
Figure 2:
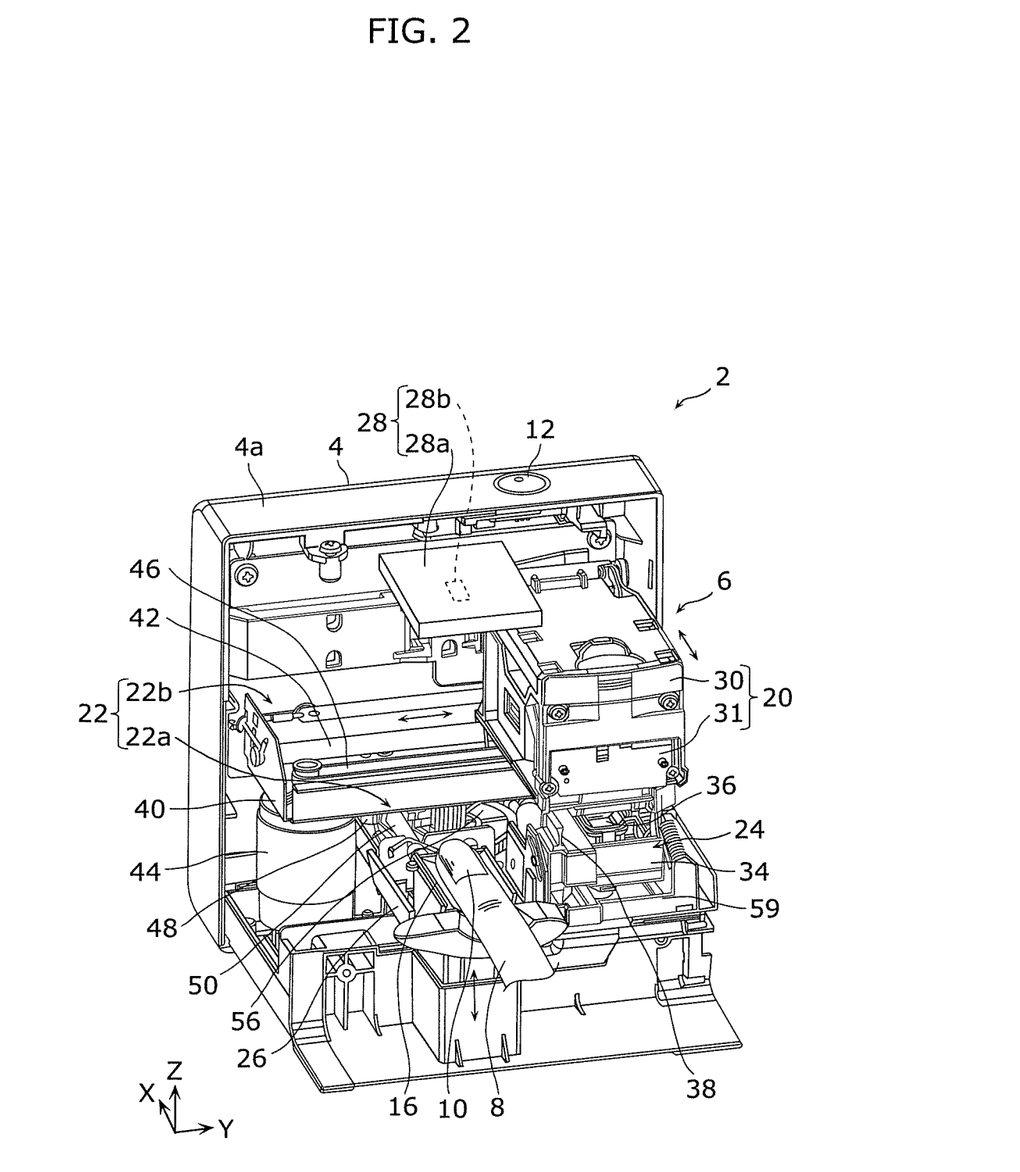
FIG. 2 is a perspective view illustrating the printing unit of the printer according to Embodiment 1.
Figure 3:
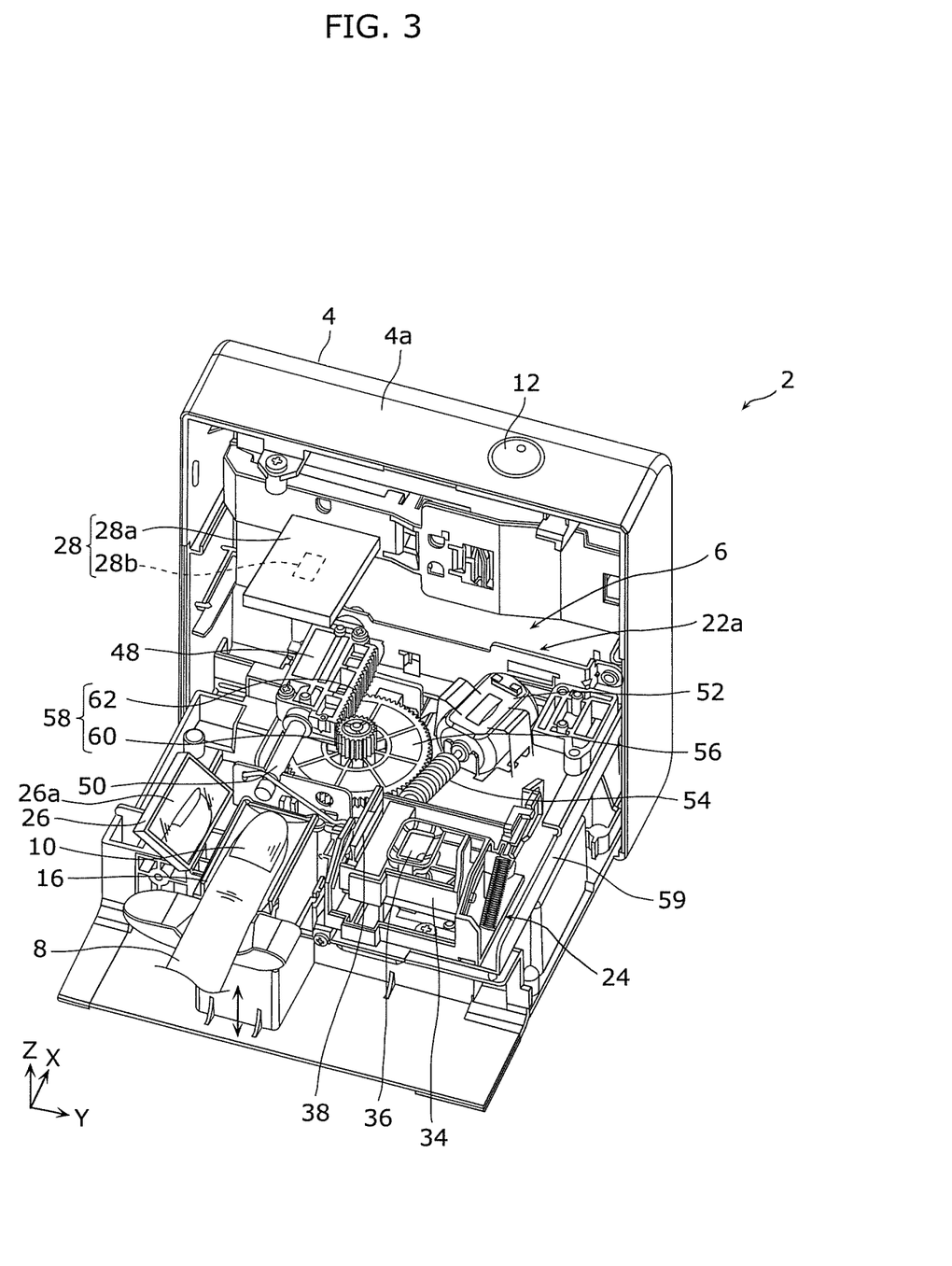
FIG. 3 is a perspective view illustrating the printing unit of the printer according to Embodiment 1 where the head and the Y-axis driving mechanism are omitted.
Figure 4:
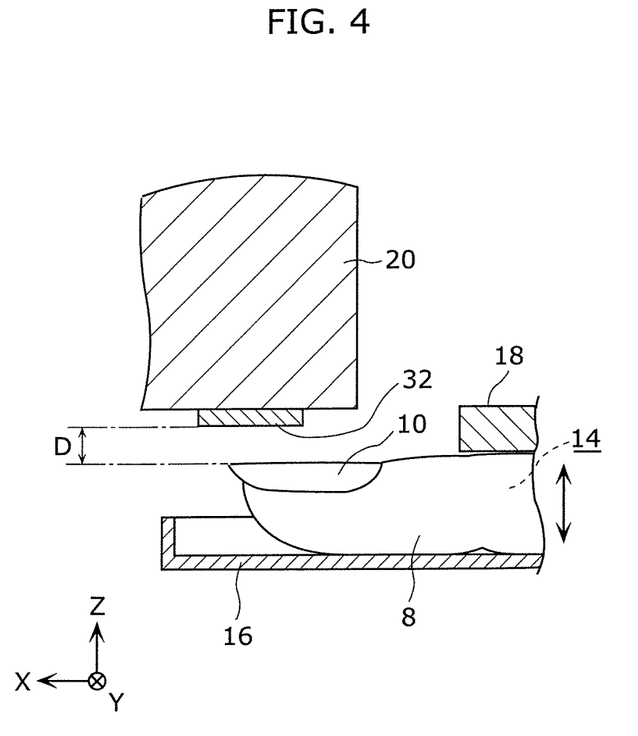
FIG. 4 is an enlarged side view illustrating a finger of a user placed on a finger holder of the printer according to Embodiment 1.
Figure 5:
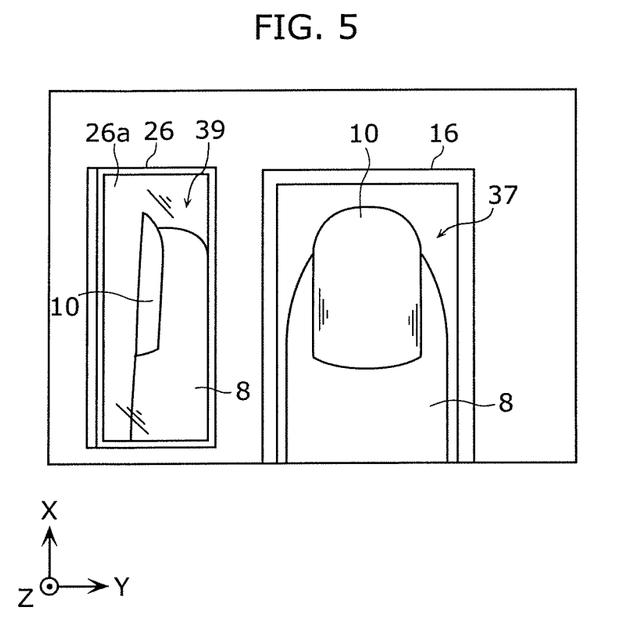
FIG. 5 is a diagram illustrating an exemplary nail top image and an exemplary nail side image generated by the image capturer of the printer according to Embodiment 1.

First, the structure of printer 2 according to Embodiment 1 will be described with reference to FIGS. 1 to 5. FIG. 1 is a perspective view illustrating an appearance of printer 2 according to Embodiment 1. FIG. 2 is a perspective view illustrating printing unit 6 of printer according to Embodiment 1. FIG. 3 is a perspective view illustrating printing unit 6 of printer 2 according to Embodiment 1 where head 20 and Y-axis driving mechanism 22b are omitted. FIG. 4 is an enlarged side view illustrating finger 8 of a user placed on finger holder 16 in printer 2 according to Embodiment 1. FIG. 5 is a diagram illustrating one examples of nail top image 37 and nail side image 39 generated by image capturer 28b in printer 2 according to Embodiment 1. For convenience of the description, part of housing 4 is omitted in FIG. 2.

As illustrated in FIGS. 1 to 3, printer 2 includes housing 4, and printing unit 6 disposed inside housing 4. In the present embodiment, printer 2 is a so-called nail printer for printing a manicure color or motif on nail 10 of finger 8 of a hand of a user, for example.

Printer 2 can wirelessly communicate with external terminal 70 (see FIGS. 6 and 7 described later) such as a smartphone or a tablet terminal. The user can operate printer 2 using application software installed in external terminal 70 as an interface.

As illustrated in FIG. 1, housing 4 is made of a resin, and has a boxed shape. Top surface 4a of housing 4 includes power supply switch 12 for turning on/off the power supply of printer 2.

As illustrated in FIG. 1, front surface 4b of housing 4 includes opening 14 into which finger 8 of the user is inserted. As illustrated in FIGS. 1 to 4, finger holder 16 for placing finger 8 of the user is disposed in a lower portion of opening 14 (on the minus side of the Z-axis). As illustrated in FIGS. 1 and 4, press cover 18 for pressing finger 8 of the user from above is disposed above opening 14 (on the plus side of the Z-axis). Finger holder 16 can move vertically to press cover 18 (in the Z-axis direction), and is urged with a spring (not illustrated) in a direction approaching to press cover 18.

As illustrated in FIGS. 2 and 3, the user inserts finger 8 into opening 14 of housing 4 such that finger 8 extends straight and nail 10 of finger 8 faces upward (see FIG. 1), and places the pad of finger 8 on finger holder 16. Thereby, a portion of finger 8 including nail 10 (for example, a portion from the tip of finger 8 to near the first joint thereof) is disposed inside housing 4. At this time, finger holder 16 is urged in a direction approaching to press cover 18. As a result, a portion of finger 8 near the first joint is held from above and below the portion by finger holder 16 and press cover 18.

As illustrated in FIG. 4, by moving finger 8 together with finger holder 16 vertically, the user can adjust the height position (position in the Z-axis direction) of nail 10 of finger 8 with respect to nozzle face 32 (described later) of head 20 to any height position. Thereby, as described later, the user can adjust the height position of nail 10 of finger 8 with respect to nozzle face 32 to a target height position which is remote from nozzle face 32 by predetermined distance D (e.g., 2 mm).

Printing unit 6 is a unit for performing manicure printing on nail 10 of finger 8 disposed inside housing 4. The printing method for printing unit 6 is an ink jet method of printing by spraying a mist of ink onto nail 10 of finger 8.

As illustrated in FIGS. 2 and 3, printing unit 6 includes head 20, driving mechanism 22, head maintaining mechanism 24, mirror 26, and imaging unit 28.

As illustrated in FIG. 2, head 20 includes head holder 30, and ink head 31 mounted on head holder 30. Ink head 31 contains several color inks or a monochromatic ink. As illustrated in FIG. 4, the bottom surface of head 20 includes nozzle face 32 which ejects the ink downwardly toward nail 10 of finger 8.

Driving mechanism 22 is a mechanism for two-dimensionally moving head 20 in a first direction (X-axis direction) (one example of a predetermined direction) and in a second direction (Y-axis direction) approximately orthogonal to the first direction (one example of the predetermined direction). A specific configuration of driving mechanism 22 will be described later.

Head maintaining mechanism 24 is a mechanism for maintaining nozzle face 32 of head 20. Head maintaining mechanism 24 includes, cap holder 34, nozzle cap 36, and wiper 38.

Cap holder 34 can move in a direction approaching to nozzle face 32 of head 20 which is in a standby position (position illustrated in FIG. 2) and a direction away from nozzle face 32. Nozzle cap 36 is a cap for capping (sealing) nozzle face 32 of head 20 which is in the standby position, and is held by cap holder 34. Wiper 38 is a wiper blade for wiping (cleaning) nozzle face 32 of head 20, and is held by cap holder 34. Wiper 38 is made of a rubber or elastomer resin having flexibility, for example.

Mirror 26 is a side view mirror having mirror surface 26a for reflecting a side of the surface of nail 10 of finger 8 placed on finger holder 16. Mirror 26 is disposed on a lateral side of finger holder 16. Mirror 26 is disposed inclined to the vertical direction (Z-axis direction) such that mirror surface 26a faces obliquely upward.

Imaging unit 28 is a camera unit for capturing an image of nail 10 of finger 8 placed on finger holder 16. Imaging unit 28 includes wiring substrate 28a disposed above finger holder 16 to face finger holder 16, and image capturer 28b mounted on a bottom surface of wiring substrate 28a. Wiring substrate 28a is held by an inner cover (not illustrated) disposed inside housing 4, for example. As illustrated in FIG. 5, image capturer 28b directly captures an image of the top of the surface of nail 10 of finger 8 placed on finger holder 16 to generate nail top image 37 showing the top of the surface of nail 10 of finger 8. Image capturer 28b captures an image of the side of the surface of nail 10 of finger 8 reflected on mirror surface 26a of mirror 26 to generate nail side image 39 showing the side of the surface of nail 10 of finger 8.

Here, the configuration of driving mechanism 22 will be described with reference to FIGS. 2 and 3. Driving mechanism 22 incudes X-axis driving mechanism 22a for moving head 20 in the first direction, and Y-axis driving mechanism 22b for moving head 20 in the second direction.

As illustrated in FIG. 2, Y-axis driving mechanism 22b includes movable table 40, Y-axis guide shaft 42, Y-axis motor 44, and timing belt 46.

Y-axis guide shaft 42 is held by movable table 40 disposed inside housing 4, and extends in the second direction in an elongated form. Head 20 is movably held by Y-axis guide shaft 42. Y-axis motor 44 is configured of a servomotor, for example, and is held by the bottom surface of movable table 40.

The driving force of Y-axis motor 44 is transmitted through timing belt 46 to head 20. As a result, head 20 reciprocally moves on movable table 40 along Y-axis guide shaft 42 in the second direction.

As illustrated in FIG. 3, X-axis driving mechanism 22a includes movable table 40 (see FIG. 2), bearing member 48, X-axis guide shaft 50, X-axis motor 52, worm gear 54, worm wheel 56, and drive conversion mechanism 58.

X-axis guide shaft 50 is held by support plate 59 disposed inside housing 4, and extends in the first direction in an elongated form. Bearing member 48 fixed to the bottom surface of movable table 40 is movably held by X-axis guide shaft 50. In other words, movable table 40 is movably held by X-axis guide shaft 50 through bearing member 48. X-axis motor 52 is configured of a servomotor, for example, and is held by support plate 59. Worm gear 54 is rotatably held by the driving shaft of X-axis motor 52. Worm wheel 56 is rotatably held by support plate 59, and is engaged with worm gear 54.

Drive conversion mechanism 58 is a mechanism for converting the rotation of worm wheel 56 to linear movement of head 20 in the first direction. Drive conversion mechanism 58 includes pinion gear 60 disposed in worm wheel 56, and rack gear 62 disposed in bearing member 48. Pinion gear 60 and rack gear 62 are engaged with each other.

The driving force of X-axis motor 52 is transmitted through worm gear 54, worm wheel 56, pinion gear 60, and rack gear 62 to movable table 40. As a result, head 20 reciprocally moves together with movable table 40 along X-axis guide shaft 50 in the first direction.

The entire region of nail 10 of finger 8 is printed by ejecting ink from nozzle face 32 of head 20 toward the surface of nail 10 of finger 8 in the state where head 20 is moving from the other side to one side (from the plus side to the minus side of the X-axis) in the first direction while reciprocally moving in the second direction.

[1-2. Functional Configuration of Printer]

Figure 6:
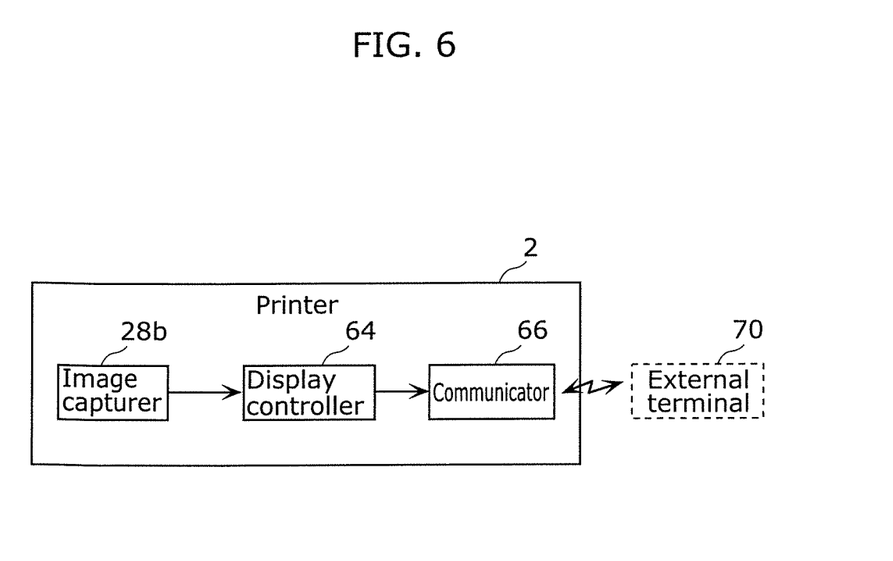
FIG. 6 is a block diagram illustrating a functional configuration of the printer according to Embodiment 1.
Figure 7:
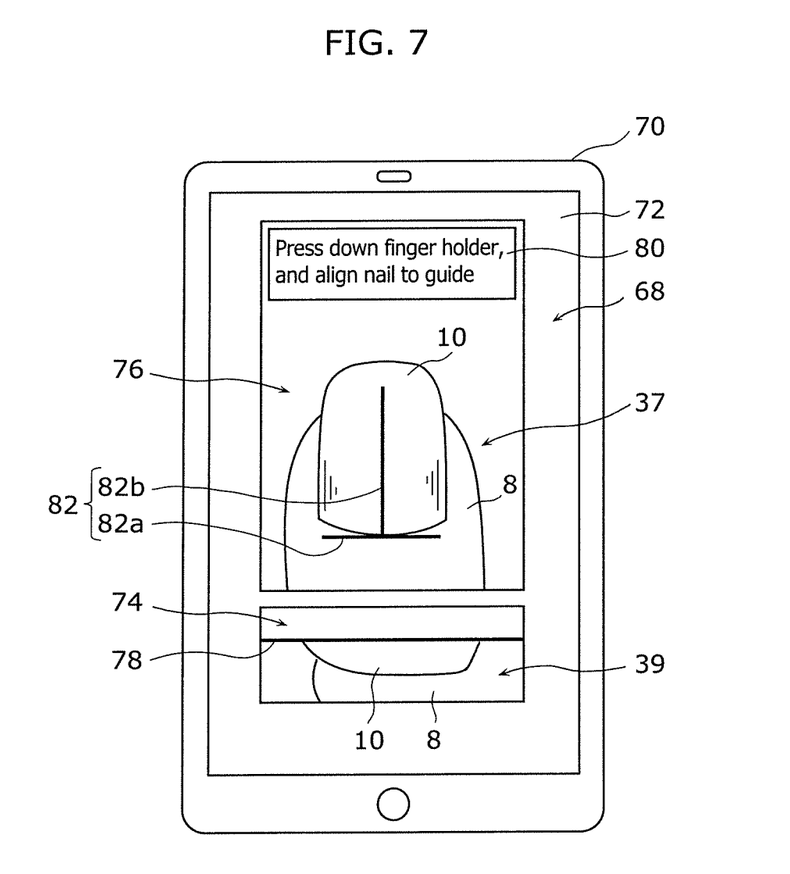
FIG. 7 is a diagram illustrating one example of an image for position adjustment according to Embodiment 1.

Next, the functional configuration of printer 2 will be described with reference to FIGS. 6 and 7. FIG. 6 is a block diagram illustrating a functional configuration of printer 2 according to Embodiment 1. FIG. 7 is a diagram illustrating one example of image 68 for position adjustment according to Embodiment 1.

As illustrated in FIG. 6, as a functional configuration, printer 2 includes image capturer 28b, display controller 64, and communicator 66.

As described above, image capturer 28b generates nail top image 37 and nail side image 39 (see FIG. 5). Image capturer 28b outputs the generated nail top image 37 and nail side image 39 to display controller 64.

As illustrated in FIG. 7, display controller 64 generates image 68 for position adjustment for adjusting the height position and horizontal lengthwise position of nail 10 of finger 8 with respect to nozzle face 32 of head 20, and displays the generated image 68 for position adjustment on display 72 of external terminal 70. Image 68 for position adjustment includes image 74 for height position adjustment for adjusting the height position of nail 10 of finger 8 with respect to nozzle face 32, and image 76 for horizontal lengthwise position adjustment for adjusting the horizontal lengthwise position (position within an X-Y plane) of nail 10 of finger 8 with respect to nozzle face 32. In other words, display controller 64 causes display 72 of external terminal 70 to simultaneously display image 74 for height position adjustment and image 76 for horizontal lengthwise position adjustment.

Display controller 64 generates image 74 for height position adjustment through image processing of nail side image 39 from image capturer 28b. Display controller 64 also generates image 76 for horizontal lengthwise position adjustment through image processing of nail top image 37 from image capturer 28b. Display controller 64 outputs image 68 for position adjustment, which includes the generated image 74 for height position adjustment and image 76 for horizontal lengthwise position adjustment, to communicator 66.

As illustrated in FIG. 7, in image 74 for height position adjustment, target height position indicator 78 indicating the target height position of the top of the surface of nail 10 of finger 8 is added to nail side image 39, where the target height position of the top of the surface of nail 10 of finger 8 is a position away from nozzle face 32 by predetermined distance D (see FIG. 4). Target height position indicator 78 is a solid line extending straight in the traverse direction, for example.

Here, predetermined distance D is preferably 1 mm to 3 mm, more preferably 1.5 mm to 2.5 mm, most preferably 2 mm. If predetermined distance D is less than 1 mm, nail 10 of finger 8 may come into contact with nozzle face 32. Such contact of nail 10 of finger 8 with nozzle face 32 may result in peel-off of the base color preliminarily applied to nail 10. If predetermined distance D is more than 3 mm, application of ink ejected from nozzle face 32 onto nail 10 may not be ensured.

As illustrated in FIG. 7, in image 76 for horizontal lengthwise position adjustment, target horizontal lengthwise position indicator 82 indicating the target horizontal lengthwise position of nail 10 of finger 8 with respect to nozzle face 32 (including the target horizontal position and the target lengthwise position) is added to nail top image 37. Target horizontal lengthwise position indicator 82 is a reverse T-shaped solid line having horizontal line 82a and longitudinal line 82b. Horizontal line 82a in target horizontal lengthwise position indicator 82 indicates the target lengthwise position (the target position in the X-axis direction) of a cuticle of nail 10 of finger 8 with respect to nozzle face 32. Longitudinal line 82b in target horizontal lengthwise position indicator 82 indicates the target horizontal position (the target position in the Y-axis direction) at the center in the transverse direction of nail 10 of finger 8 with respect to nozzle face 32.

As illustrated in FIG. 7, message box 80 for prompting the user to adjust the height position of nail 10 of finger 8 to the target height position is displayed in image 68 for position adjustment. Message box 80 displays a message "Press down finger holder, and align nail to guide (target height position indicator 78)", for example.

Communicator 66 wirelessly transmits and receives a variety of pieces of data to and from external terminal 70. Specifically, communicator 66 transmits image 68 for position adjustment generated by display controller 64 to external terminal 70 through a wireless network such as Wi-Fi (registered trademark) or Bluetooth (registered trademark). Although communicator 66 is wirelessly connected to external terminal 70 in the present embodiment, any other connection form can be used. For example, communicator 60 may be wiredly connected to external terminal 70 through a universal serial bus (USB) cable, for example.

Thereby, as illustrated in FIG. 7, the received image 68 for position adjustment is displayed on display 72 of external terminal 70. Image 74 for height position adjustment is displayed in a lower region of image 68 for position adjustment, and image 76 for horizontal lengthwise position adjustment is displayed in an upper region of image 68 for position adjustment. Display 72 of external terminal 70 is configured of a liquid crystal touch panel, for example.

[1-3. Operation of Printer]

Figure 8:
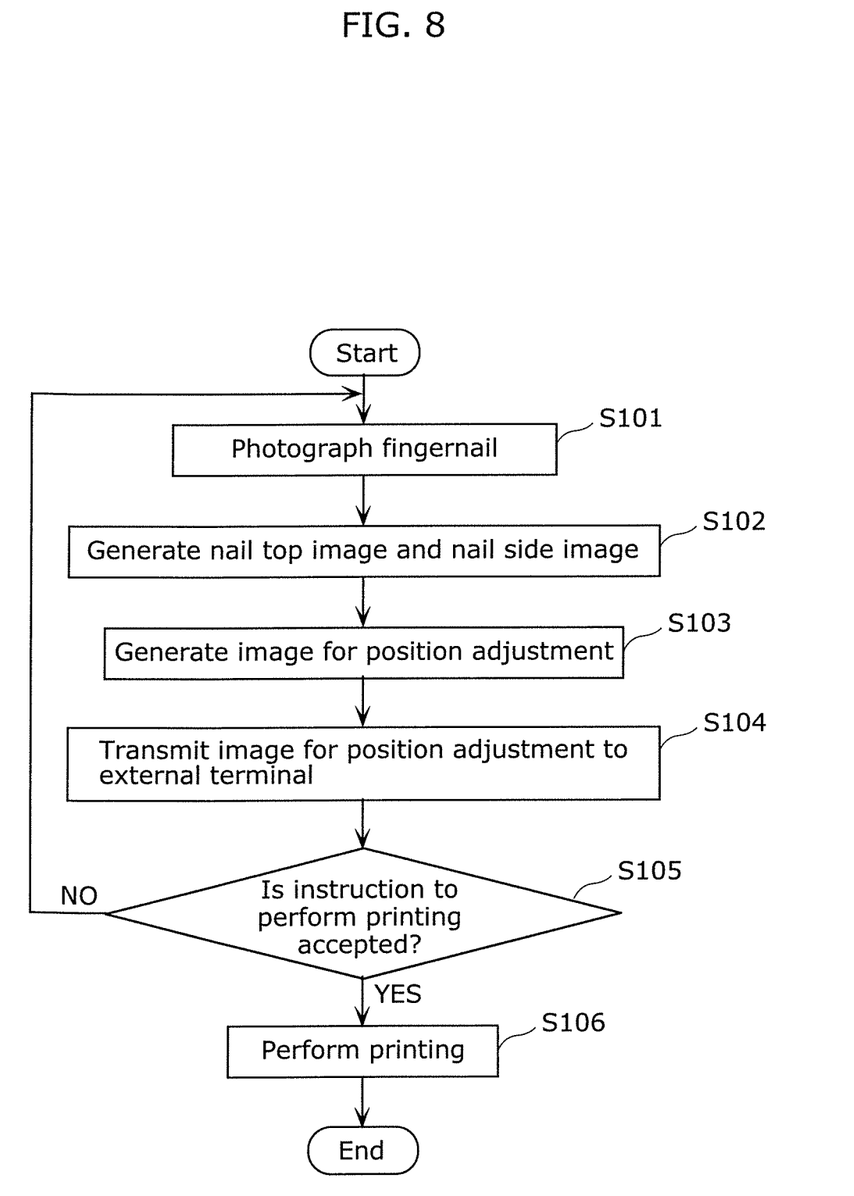
FIG. 8 is a flowchart illustrating a flow of operations of the printer according to Embodiment 1.

Next, the operation of printer 2 will be described with reference to FIG. 8. FIG. 8 is a flowchart illustrating a flow of operations of printer 2 according to Embodiment 1.

The user inserts finger 8 into opening 14 of housing 4, and places finger 8 on finger holder 16. In this state, the user operates external terminal 70. Thereby, image capturer 28b captures an image of nail 10 of finger 8 placed on finger holder 16 (S101) to generate nail top image 37 and nail side image 39 (S102).

Display controller 64 performs image processing on nail top image 37 and nail side image 39 from image capturer 28b to generate image 68 for position adjustment (S103). Communicator 66 transmits image 68 for position adjustment generated by display controller 64 to external terminal 70 (S104).

Thereby, as illustrated in FIG. 7, image 76 for horizontal lengthwise position adjustment including nail top image 37 indicating a real-time horizontal lengthwise position of nail 10 of finger 8 with respect to nozzle face 32 and image 74 for height position adjustment including nail side image 39 indicating a real-time height position of nail 10 of finger 8 with respect to nozzle face 32 are displayed on display 72 of external terminal 70.

As illustrated in FIG. 7, while viewing image 74 for height position adjustment displayed on display 72 of external terminal 70, the user adjusts the height position of nail 10 of finger 8 with respect to nozzle face 32 to the target height position such that the top of the surface of nail 10 of finger 8 is aligned with target height position indicator 78 on image 74 for height position adjustment. Moreover, while viewing image 76 for horizontal lengthwise position adjustment displayed on display 72 of external terminal 70, the user adjusts the horizontal lengthwise position of nail 10 of finger 8 with respect to nozzle face 32 to the target horizontal lengthwise position such that the cuticle of nail 10 of finger 8 is aligned with horizontal line 82a in target horizontal lengthwise position indicator 82 on image 76 for horizontal lengthwise position adjustment and the center of nail 10 of finger 8 in the transverse direction is aligned with longitudinal line 82*b* of target horizontal lengthwise position indicator 82.

If printer 2 accepts an instruction to execute printing after the user adjusts the horizontal lengthwise position and height position of nail 10 of finger 8 with respect to nozzle face 32 and operates external terminal 70 (YES in S105), printing is executed in printer 2 (S106). In contrast, if printer 2 does not accept the instruction to execute printing (NO in S105), the processing returns to step S101 described above.

[1-4. Effects]

As illustrated in FIG. 7, while viewing image 74 for height position adjustment displayed on display 72 of external terminal 70, the user can easily adjust the height position of nail 10 of finger 8 with respect to nozzle face 32 to the target height position such that the top of the surface of nail 10 of finger 8 is aligned with target height position indicator 78 on image 74 for height position adjustment. As a result, printing on nail 10 of finger 8 can be precisely performed.

Furthermore, while viewing image 76 for horizontal lengthwise position adjustment displayed on display 72 of external terminal 70, the user can easily adjust the horizontal lengthwise position of nail 10 of finger 8 with respect to nozzle face 32 to the target horizontal lengthwise position such that the cuticle of nail 10 of finger 8 is aligned with horizontal line 82*a* of target horizontal lengthwise position indicator 82 on image 76 for horizontal lengthwise position adjustment and the center of nail 10 of finger 8 in the transverse direction is aligned with longitudinal line 82*b* of target horizontal lengthwise position indicator 82. As a result, printing on nail 10 of finger 8 can be more precisely performed.

[1-5. Modifications of Image for Height Position Adjustment]

Although target height position indicator 78 in image 74 for height position adjustment is defined by a solid line extending straight in the traverse direction in the present embodiment, target height position indicator 78 can have any other form. Hereinafter, Modifications 1 to 4 of image 74 for height position adjustment will be described with reference to FIGS. 9A to 9D.

Figure 9A:
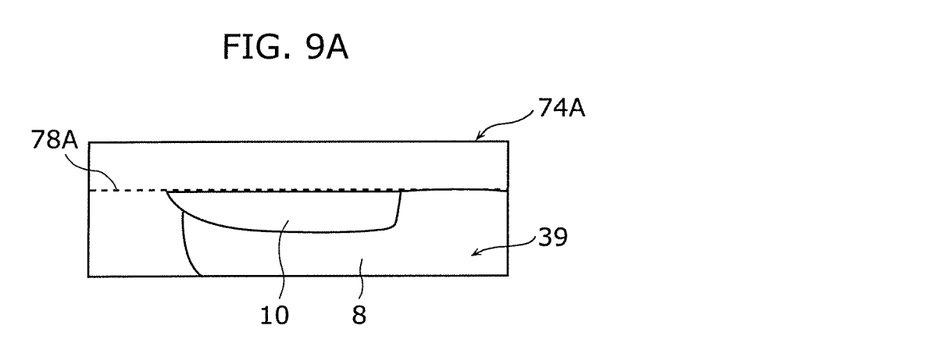
FIG. 9A is a diagram illustrating one example of an image for height position adjustment according to Modification 1 of Embodiment 1.

FIG. 9A is a diagram illustrating one example of image 74A for height position adjustment according to Modification 1 of Embodiment 1. As illustrated in FIG. 9A, in image 74A for height position adjustment according to the present modification, target height position indicator 78A is defined by a straight dashed line extending in the traverse direction. The user adjusts the height position of nail 10 of finger 8 with respect to nozzle face 32 to the target height position such that the top of the surface of nail 10 of finger 8 is aligned with the dashed line of target height position indicator 78A on image 74A for height position adjustment. Instead of the dashed line described above, target height position indicator 78A may be defined by a dotted line or a wavy line, for example.

Figure 9B:
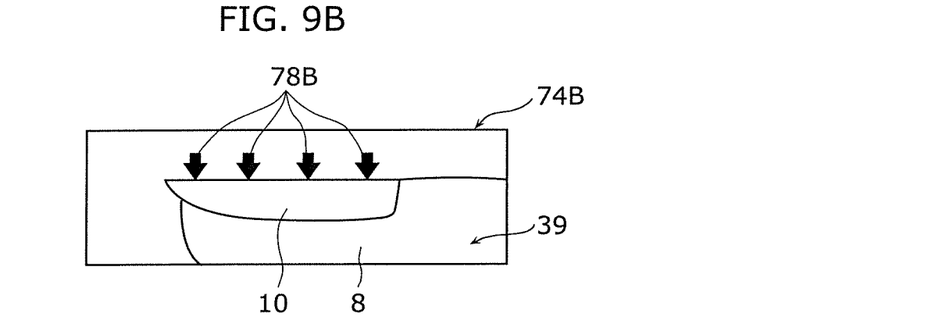
FIG. 9B is a diagram illustrating one example of an image for height position adjustment according to Modification 2 of Embodiment 1.

FIG. 9B is a diagram illustrating one example of image 74B for height position adjustment according to Modification 2 of Embodiment 1. As illustrated in FIG. 9B, in image 74B for height position adjustment according to the present modification, target height position indicator 78B is defined by several down arrows disposed in the traverse direction at an interval. The user adjusts the height position of nail 10 of finger 8 with respect to nozzle face 32 to the target height position such that the top of the surface of nail 10 of finger 8 is aligned with the tips of the arrows of target height position indicator 78B on image 74B for height position adjustment.

Figure 9C:
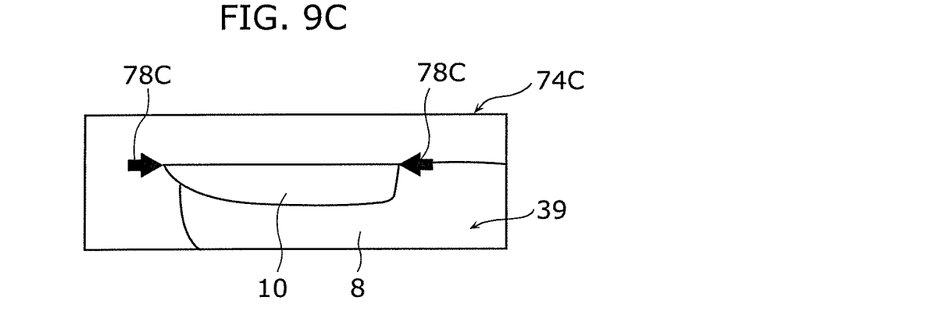
FIG. 9C is a diagram illustrating one example of an image for height position adjustment according to Modification 3 of Embodiment 1.

FIG. 9C is a diagram illustrating one example of image 74C for height position adjustment according to Modification 3 of Embodiment 1. As illustrated in FIG. 9C, in image 74C for height position adjustment according to the present modification, target height position indicator 78C is defined by a pair of arrows horizontally disposed in the traverse direction at an interval. The user adjusts the height position of nail 10 of finger 8 with respect to nozzle face 32 to the target height position such that the top of the surface of nail 10 of finger 8 is aligned with the tips of the arrows of target height position indicator 78C on image 74C for height position adjustment.

Figure 9D:
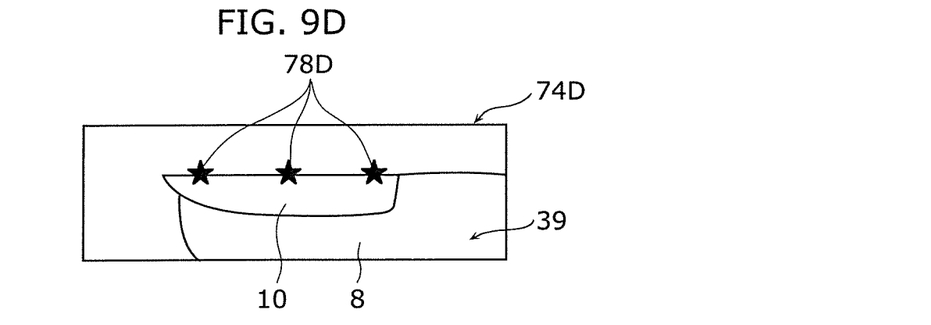
FIG. 9D is a diagram illustrating one example of an image for height position adjustment according to Modification 4 of Embodiment 1.

FIG. 9D is a diagram illustrating one example of image 74D for height position adjustment according to Modification 4 of Embodiment 1. As illustrated in FIG. 9D, in image 74D for height position adjustment according to the present modification, target height position indicator 78D is defined by several stars disposed in the traverse direction at an interval. The user adjusts the height position of nail 10 of finger 8 with respect to nozzle face 32 to the target height position such that the top of the surface of nail 10 of finger 8 is aligned with the several stars of target height position indicator 78D on image 74D for height position adjustment. Instead of the stars described above, target height position indicator 78D may be defined by any other figures such as triangles or rhombuses, for example.

Embodiment 2

[2-1. Functional Configuration of Printer]

Figure 10:
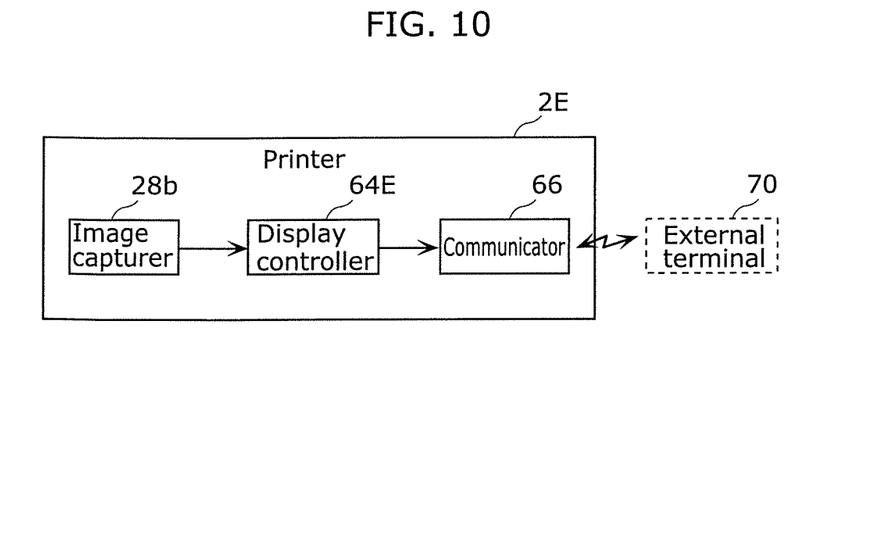
FIG. 10 is a block diagram illustrating a functional configuration of the printer according to Embodiment 2.
Figure 11:
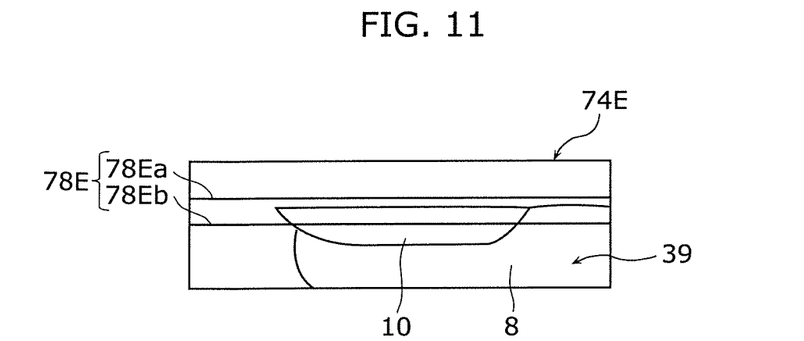
FIG. 11 is a diagram illustrating one example of an image for height position adjustment according to Embodiment 2.

The functional configuration of printer 2E according to Embodiment 2 will be described with reference to FIGS. 10 and 11. FIG. 10 is a block diagram illustrating a functional configuration of printer 2E according to Embodiment 2. FIG. 11 is a diagram illustrating one example of image 74E for height position adjustment according to Embodiment 2. In the embodiments below, the same referential numerals will be given to the same components as those in Embodiment 1, and the descriptions thereof will be omitted.

As illustrated in FIG. 10, the processing of display controller 64E in printer 2E according to the present embodiment is different from that in Embodiment 1. Specifically, display controller 64E performs image processing on nail side image 39 from image capturer 28*b* to generate image 74E for height position adjustment illustrated in FIG. 11.

As illustrated in FIG. 11, in image 74E for height position adjustment, target height position indicator 78E indicating the target height position range of the top of the surface of nail 10 of finger 8 which is a range of a predetermined distance (such as 1 mm to 3 mm) spaced from nozzle face 32 (see FIG. 4) is added to nail side image 39. Specifically, target height position indicator 78E indicates the target height position range between the target upper limit height position of the top of the surface of nail 10 of finger 8 spaced from nozzle face 32 by a first predetermined distance (such as 1 mm) and the target lower limit height position of the top of the surface of nail 10 of finger 8 spaced from nozzle face 32 by a second predetermined distance (such as 3 mm), which is longer than the first predetermined distance.

As illustrated in FIG. 11, target height position indicator 78E is two solid lines 78Ea and 78Eb extending straight in the traverse direction, for example. Among two solid lines 78Ea and 78Eb illustrated in FIG. 11, solid line 78Ea is an indicator to indicate the target upper limit height position and solid line 78Eb therebelow is an indicator to indicate the target lower limit height position. In other words, the range between two solid lines 78Ea and 78Eb illustrated in FIG. 11 indicates a region of target height position between the target upper limit height position and the target lower limit height position.

[2-2. Effects]

As illustrated in FIG. 11, while viewing image 74E for height position adjustment, the user can easily adjust the height position of nail 10 of finger 8 with respect to nozzle face 32 to the target height position range such that the top of the surface of nail 10 of finger 8 is aligned with target height position indicator 78E (the region between two solid lines 78Ea and 78Eb) on image 74E for height position adjustment.

Thereby, the precision of adjustment of the height position of nail 10 of finger 8 with respect to nozzle face 32 can have a higher allowance than that of Embodiment 1.

[2-3. Modifications of Image for Height Position Adjustment]

Although target height position indicator 78E in image 74E for height position adjustment is defined by two solid lines 78Ea and 78Eb extending straight in the traverse direction in the present embodiment, target height position indicator 78E can have any other form. Hereinafter, Modifications 1 to 3 of image 74E for height position adjustment will be described with reference to FIGS. 12A to 12C.

Figure 12A:
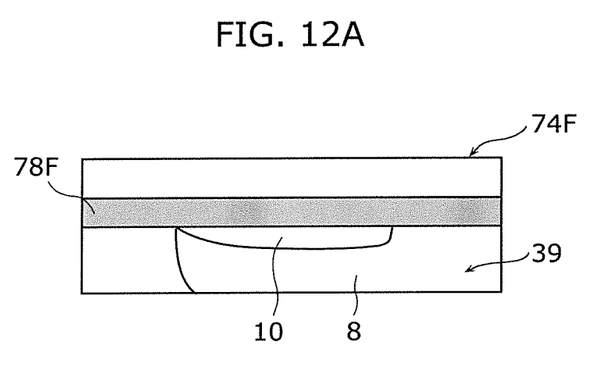
FIG. 12A is a diagram illustrating one example of an image for height position adjustment according to Modification 1 of Embodiment 2.

FIG. 12A is a diagram illustrating one example of image 74F for height position adjustment according to Modification 1 of Embodiment 2. As illustrated in FIG. 12A, in image 74F for height position adjustment according to the present modification, target height position indicator 78F is defined by an opaque band-like line extending straight in the traverse direction. While viewing image 74F for height position adjustment, the user can easily adjust the height position of nail 10 of finger 8 with respect to nozzle face 32 to the target height position range such that the top of the surface of nail 10 of finger 8 is aligned with target height position indicator 78F (band-like line) on image 74F for height position adjustment.

Figure 12B:
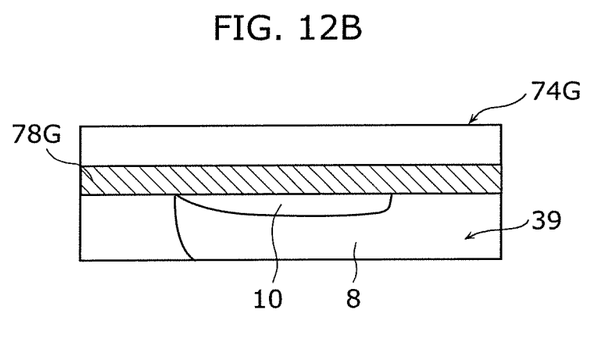
FIG. 12B is a diagram illustrating one example of an image for height position adjustment according to Modification 2 of Embodiment 2.

FIG. 12B is a diagram illustrating one example of image 74G for height position adjustment according to Modification 2 of Embodiment 2. As illustrated in FIG. 12B, in image 74G for height position adjustment according to the present modification, target height position indicator 78G is defined by a band-like hatched region extending straight in the traverse direction. While viewing image 74G for height position adjustment, the user can easily adjust the height position of nail 10 of finger 8 with respect to nozzle face 32 to the target height position range such that the top of the surface of nail 10 of finger 8 is aligned with target height position indicator 78G (band-like hatched region) on image 74G for height position adjustment.

Figure 12C:
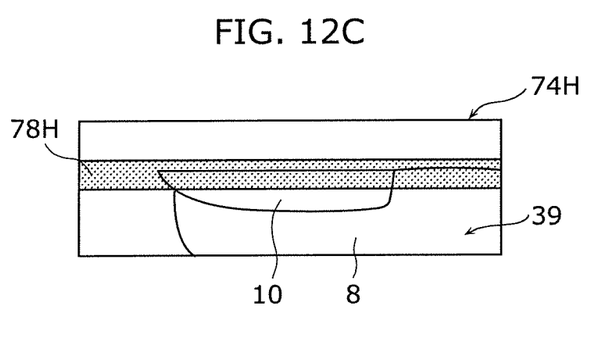
FIG. 12C is a diagram illustrating one example of an image for height position adjustment according to Modification 3 of Embodiment 2.

FIG. 12C is a diagram illustrating one example of image 74H for height position adjustment according to Modification 3 of Embodiment 2. As illustrated in FIG. 12C, in image 74H for height position adjustment according to the present modification, target height position indicator 78H is defined by a transparent band-like line extending straight in the traverse direction. While viewing image 74H for height position adjustment, the user can easily adjust the height position of nail 10 of finger 8 with respect to nozzle face 32 to the target height position range such that the top of the surface of nail 10 of finger 8 is aligned with target height position indicator 78H (band-like line) on image 74H for height position adjustment.

Embodiment 3

[3-1. Functional Configuration of Printer]

Figure 13:
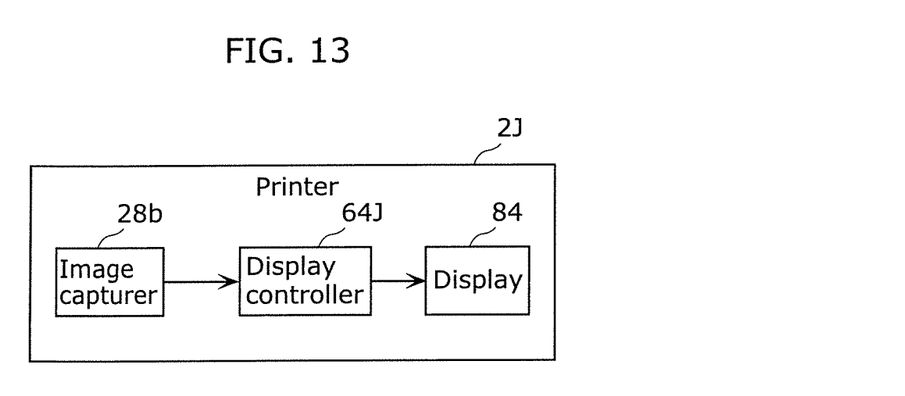
FIG. 13 is a block diagram illustrating a functional configuration of the printer according to Embodiment 3.
Figure 14:
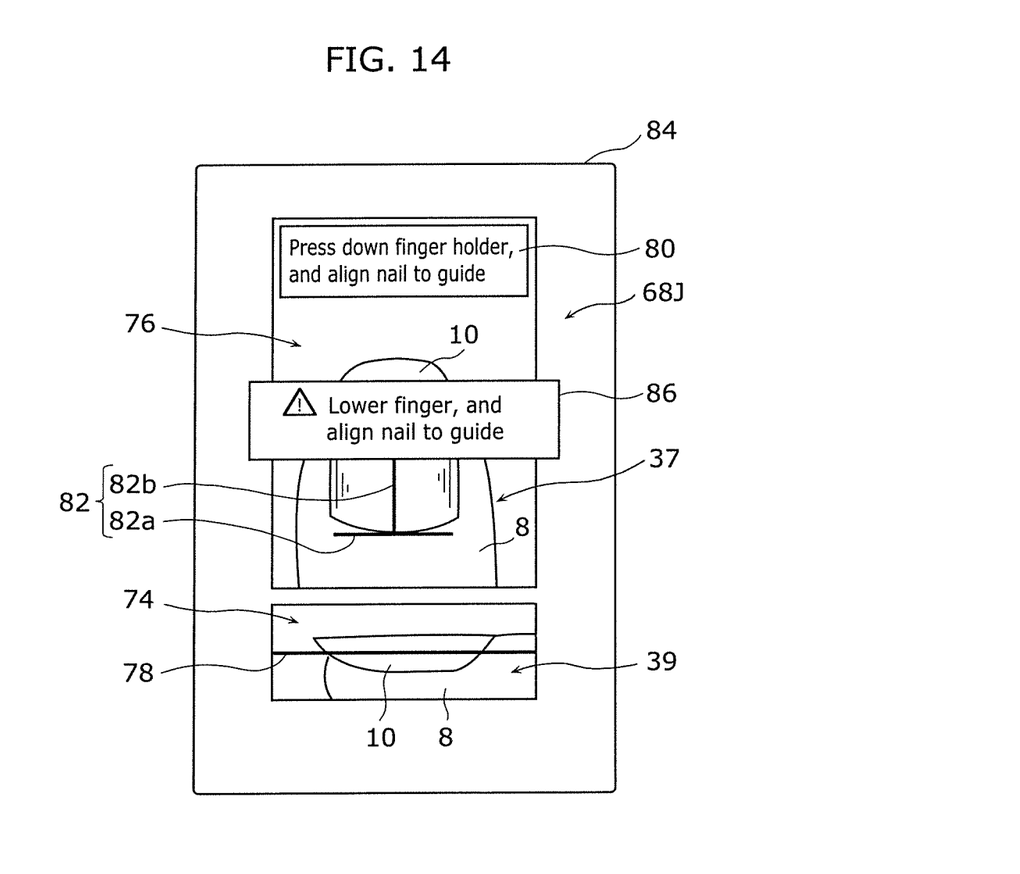
FIG. 14 is a diagram illustrating one example of an image for position adjustment according to Embodiment 3.

The functional configuration of printer 23 according to Embodiment 3 will be described with reference to FIGS. 13 and 14. FIG. 13 is a block diagram illustrating a functional configuration of printer 23 according to Embodiment 3. FIG. 14 is a diagram illustrating one example of image 68J for position adjustment according to Embodiment 3.

As illustrated in FIG. 13, the processing of display controller 64J in printer 23 according to the present embodiment is different from that in Embodiment 1. Printer 23 includes display 84 rather than communicator 66 described in Embodiment 1. Display 84 is configured of a liquid crystal touch panel, for example, and is disposed on front surface 4b of housing 4 (see FIG. 1).

Display controller 64J generates image 68J for position adjustment illustrated in FIG. 14, and causes display 84 of printer 23 to display the generated image 68J for position adjustment. Based on nail side image 39 and target height position indicator 78, display controller 64J determines whether the height position of nail 10 of finger 8 with respect to nozzle face 32 (see FIG. 4) is deviated from the target height position. When display controller 64J determines that the height position of nail 10 of finger 8 with respect to nozzle face 32 is deviated from the target height position, display controller 64J displays notice 86 for informing the user of the deviation on image 68J for position adjustment. Notice 86 displays a message, for example, "Lower finger to align nail to guide (target height position indicator 78)".

[3-2. Effects]

The user sees notice 86 displayed on display 84, and can recognize that the height position of nail 10 of finger 8 with respect to nozzle face 32 is deviated from the target height position.

[Modifications]

Although the printers according to Embodiments 1 to 3 of the present disclosure have been described, these embodiments should not be construed as limitations to the present disclosure. For example, these embodiments above may be combined.

Although image capturer 28b generates nail top image 37 by directly capturing an image of the top of the surface of nail 10 of finger 8 placed on finger holder 16 and generates nail side image 39 by capturing an image of the side of the surface of nail 10 of finger 8 reflected on mirror surface 26a of mirror 26 in the embodiments above, nail top image 37 and nail side image 39 may be generated by any other method. For example, mirror 26 may be disposed above finger holder 16 to face finger holder 16, and image capturer 28b may be disposed on a lateral side of finger holder 16. In this case, image capturer 28b generates nail top image 37 by capturing an image of the top of the surface of nail 10 of finger 8 disposed on finger holder 16 and reflected on mirror surface 26a of mirror 26, and generates nail side image 39 by directly capturing an image of the side of the surface of nail 10 of finger 8.

Alternatively, a first image capturer and a second image capturer may be disposed as image capturers. In this case, the first image capturer is disposed to face an upper portion of finger holder 16, and generates nail top image 37 by directly capturing an image of the top of the surface of nail 10 of finger 8 disposed on finger holder 16. The second image capturer is disposed on a lateral side of finger holder 16, and generates nail side image 39 by capturing an image of the side of the surface of nail 10 of finger 8 reflected on mirror surface 26a of mirror 26.

Although image 74 (74A to 74H) for height position adjustment is displayed in a lower region of image 68 (683) for position adjustment and image 76 for horizontal lengthwise position adjustment is displayed in an upper region of image 68 (683) for position adjustment in the embodiments above, any other layout of these images can be used. For example, the layout of the display may be switched by the operation of external terminal 70 by the user such that image 76 for horizontal lengthwise position adjustment is displayed in a lower region of image 68 (683) for position adjustment and image 74 (74A to 74H) for height position adjustment is displayed in an upper region of image 68 (683) for position adjustment. In this case, image 74 (74A to 74H) for height position adjustment may be displayed larger than image 76 for horizontal lengthwise position adjustment.

Although display controller 64 (64E) causes display 72 of external terminal 70 to display image 68 for position adjustment and display controller 643 causes display 84 of printer 2J to display image 683 for position adjustment in the embodiments above, the image may be displayed by any other method. For example, the image may be displayed on displays of a variety of terminals, such as a goggle type terminal put on the head of the user.

Although image 68 (683) for position adjustment includes image 74 (74A to 74H) for height position adjustment and image 76 for horizontal lengthwise position adjustment in the embodiments above, image 68 (683) may have any other configuration. Image 76 for horizontal lengthwise position adjustment may be omitted.

Although driving mechanism 22 two-dimensionally moves head 20 in the first direction and the second direction in the embodiments above, head 20 can move in any other way. For example, head 20 may one-dimensionally move in the first direction or the second direction (one example of a predetermined direction). Alternatively, driving mechanism 22 may be omitted, and head 20 may be fixed to a predetermined position inside housing 4.

The devices above may be specifically configured as a computer system including a microprocessor, a read only memory (ROM), a random access memory (RAM), a hard disk drive, a display, a keyboard, and a mouse. The RAM or the hard disk drive stores computer programs. The microprocessor operates according to the computer programs, and thereby the devices accomplish their functions. Here, the computer programs are composed of combinations of several command codes to send instructions to the computer to accomplish predetermined functions.

Furthermore, part or all of the components forming the devices above may be configured of a single system large scale integration (LSI: large-scale integrated circuit). The system LSI is a super multi-function LSI fabricated by integrating a plurality of constitutional parts on a single chip, and specifically is a computer system having a configuration including a microprocessor, a ROM, and a RAM. The RAM stores computer programs. The microprocessor operates according to the computer programs, and thereby the system LSI accomplishes the function.

Furthermore, part or all of the components forming the devices above may be configured of an IC card or a single module detachable from the devices. The IC card or the module is a computer system having a configuration including a microprocessor, a ROM, and a RAM. The IC card or the module may include the super multi-function LSI. The microprocessor operates according to computer programs, and thereby the IC card or the module accomplishes the function. The IC card or the module may have tamper proofness.

The present disclosure may be the methods described above. Moreover, the present disclosure may be a computer program causing a computer to implement these methods, or may be digital signals composed of the computer program.

Furthermore, the present disclosure may be the computer program or the digital signals recorded on a non-transitory computer-readable recording medium, such as a flexible disk, a hard disk, a CD-ROM, a MO, a DVD, a DVD-ROM, a DVD-RAM, a Blu-ray (BD) (registered trademark) Disc), or a semiconductor memory. Alternatively, the present disclosure may be the digital signals recorded on these non-transitory recording media.

Moreover, the present disclosure may be the computer program or the digital signals transmitted via an electrical communication line, a wireless or wired communication line, a network such as the Internet, or data broadcasting.

Moreover, the present disclosure may be a computer system including a microprocessor and a memory. The memory may store the computer program, and the microprocessor may operate according to the computer program.

Moreover, the program or the digital signals may be implemented with another independent computer system by recording the program or the digital signals in the non-transitory recording medium and transferring the non-transitory recording medium, or by transferring the program or the digital signals via the network.

It should be noted that in the embodiments above, the components each may be configured of dedicated hardware, or may be implemented by executing a software program suitable for each component. Each component may be implemented by a program executer such as a CPU or a processor which reads out and executes the software program recorded on a recording medium such as a hard disk or a semiconductor memory.

INDUSTRIAL APPLICABILITY

The present disclosure can be used as a printer for performing manicure printing on a fingernail of a user, for example.

REFERENCE SIGNS LIST

2, 2E, 2J printer
4 housing
4a top surface
4b front surface
6 printing unit
8 finger
10 nail
12 power supply switch
14 opening
16 finger holder
18 press cover
20 head
22 driving mechanism
22a X-axis driving mechanism
22b Y-axis driving mechanism
24 head maintaining mechanism
26 mirror
26a mirror surface
28 imaging unit
28a wiring substrate
28b image capturer
30 head holder
31 ink head
32 nozzle face 34 cap holder
36 nozzle cap
37 nail top image
38 wiper
39 nail side image
40 movable table
42 Y-axis guide shaft
44 Y-axis motor
46 timing belt
48 bearing member
50 X-axis guide shaft
52 X-axis motor
54 worm gear
56 worm wheel
58 drive conversion mechanism
59 support plate
60 pinion gear
62 rack gear
64, 64E, 64J display controller
66 communicator
68, 68J image for position adjustment
70 external terminal
72, 84 display
74, 74A, 74B, 74C, 74D, 74E, 74F, 74G, 74H image for height position adjustment
76 image for horizontal lengthwise position adjustment
78, 78A, 78B, 78C, 78D, 78E, 78F, 78G, 78H target height position indicator
78Ea, 78Eb solid line
80 message box
82 target horizontal lengthwise position indicator
82a horizontal line
82b longitudinal line
86 notice

The invention claimed is:

1. A printer for printing on a fingernail of a user, comprising:
   a head which includes a nozzle face which ejects ink toward a surface of the fingernail;
   a driving mechanism which moves the head in a predetermined direction;
   an image capturer which captures an image of the fingernail to generate a nail side image showing a side of the surface of the fingernail; and
   a display controller which causes a display to display an image for height position adjustment including a target height position indicator added to the nail side image by performing image processing on the nail side image from the image capturer, the target height position indicator indicating a target height position of the fingernail spaced from the nozzle face by a predetermined distance.

2. The printer according to claim 1,
   wherein the image capturer captures an image of the fingernail to generate a nail top image showing a top of the surface of the fingernail, and
   the display controller causes the display to display the image for height position adjustment and an image for horizontal lengthwise position adjustment including a target horizontal lengthwise position indicator added to the nail top image by performing image processing on the nail top image from the image capturer, the target horizontal lengthwise position indicator indicating a target horizontal lengthwise position of the fingernail with respect to the nozzle face.

3. The printer according to claim 2, further comprising:
   a mirror which reflects the side of the surface of the fingernail,
   wherein the image capturer generates the nail top image by directly capturing an image of the top of the surface of the fingernail, and generates the nail side image by capturing an image of the side of the surface of the fingernail reflected on the mirror.

4. The printer according to claim 2, further comprising:
   a mirror which reflects the top of the surface of the fingernail,
   wherein the image capturer generates the nail side image by directly capturing an image of the side of the surface of the fingernail, and generates the nail top image by capturing an image of the top of the surface of the fingernail reflected on the mirror.

5. The printer according to claim 1,
   wherein the display controller further causes the display to display a notice for informing the user when a height position of the fingernail is deviated from the target height position.

6. The printer according to claim 1,
   wherein the target height position indicator indicates a target height position range between a target upper limit height position of the fingernail spaced from the nozzle face by a first predetermined distance and a target lower limit height position of the fingernail spaced from the nozzle face by a second predetermined distance longer than the first predetermined distance.

7. The printer according to claim 6,
   wherein the first predetermined distance is 1 mm and the second predetermined distance is 3 mm.

* * * * *